Feb. 1, 1949.  C. M. GILBERT  2,460,638
SERVO FOLLOW-UP CONTROL
Filed Nov. 13, 1946  2 Sheets-Sheet 2

Inventor
CLARKE M. GILBERT.
By
*H. S. Mackey*
Attorney

Patented Feb. 1, 1949

2,460,638

UNITED STATES PATENT OFFICE 2,460,638

SERVO FOLLOW-UP CONTROL

Clarke M. Gilbert, Chappaqua, N. Y., assignor to General Precision Laboratory Incorporated, a corporation of New York Application November 13, 1946, Serial No. 709,653

11 Claims. (Cl. 318—30)

My invention relates to a servo control wherein the output shaft is caused to follow the rotation of an input shaft with a high degree of accuracy and at the same time to deliver a substantial amount of power.

Servo controls are extensively used and not infrequently a single system such as fire control systems, analyzer systems, training apparatus and the like, use literally hundreds of such devices. It is extremely advantageous therefore, that such devices be made as small as possible and be composed of as few circuit components as possible.

One of the objects of my invention therefore, is to provide a servo control which includes a minimum number of circuit elements but which nevertheless is positive and accurate in operation.

Another object of my invention is to provide a means for effecting servo control through the medium of but a single thyratron operating a small relay to control the rotation of a motor.

Still another object of my invention is the provision of delay means, such that the effective firing action of a single thyratron is caused to extend over a portion of the negative half cycle, thus accomplishing with a single thyratron what has heretofore necessitated the use of two thyratrons connected in opposition.

A still further object of my invention resides in the use of a system powered solely by alternating current potential, thereby eliminating the necessity of filter and rectifier circuits.

Figure 1:
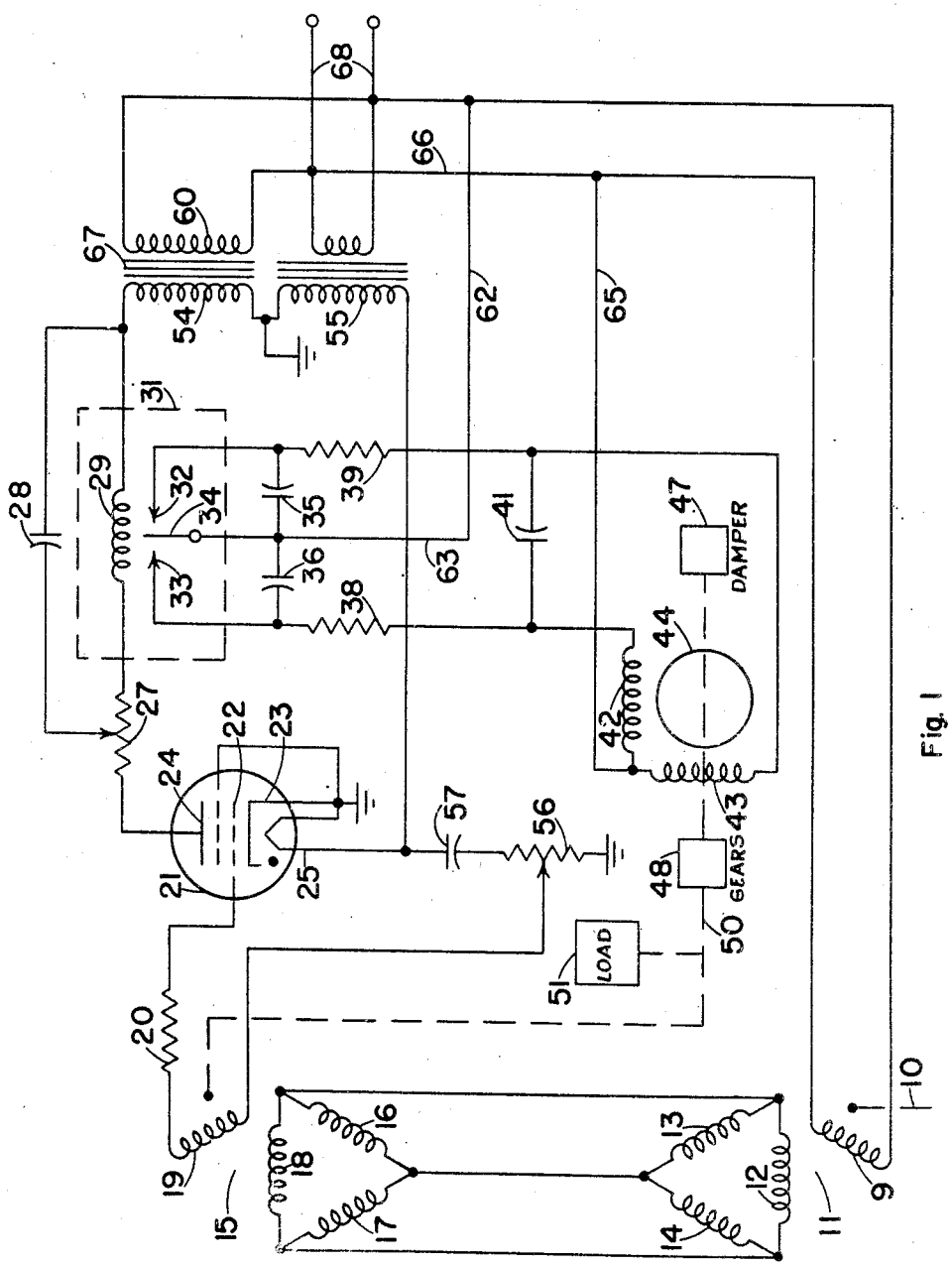

These and other objects and advantages of my invention will be apparent from the following specification when taken with the accompanying drawings in which:

Figure 1 is a circuit diagram illustrating the preferred embodiment of my invention and Figures 2A, 2B, 2C, 3A, 3B and 3C are curves illustrating the characteristic action of the circuit Figure 1.

Referring to Figure 1 an input shaft 10 is connected to the rotor 9 of a synchro generator 11. The rotor 9 is connected to the power source 68 and the generator 11 has the usual stator windings 12, 13 and 14 which are connected in parallel to the stator windings 16, 17 and 18 of the synchro transformer 15. The rotor 19 of the synchro transformer 15 is mechanically connected to the output shaft 50.

In the operation of synchro transmission systems such as depicted by the circuit consisting of the generator 11 and the transformer 15, when the rotor 19 is caused to assume an angle of rotation different from that of the rotor 9 a potential having a phase and amplitude which is a function of the difference in angular positions of the rotor 9 and the rotor 19 is generated in the rotor 19. In the present invention this potential, which is here termed an error voltage, is impressed on a single thyratron the output of which through the action of positioning apparatus is used to so rotate the rotor 19 as to decrease the error in angular position between the rotor 9 and rotor 19 and hence the input shaft 10 and output shaft 50.

To provide a means for properly adjusting the system at zero error conditions a bias fixed in phase and amplitude is impressed on the input of the thyratron 21 by means of the potentiometer 56 and condenser 57 connected across the filament 25.

The output of the thyratron is connected through relay coil 29 of a relay indicated generally by dotted lines 31 to the secondary 54 of the power transformer 67. Likewise connected in the output of the thyratron and associated with the relay coil 29 is a delay network consisting of condenser 26 and potentiometer 27 for the purpose more fully hereinafter explained. The relay 31 comprises the aforementioned relay coil 29 and a vibrating reed armature 34 normally biased to engage contact 32 but operable when sufficient current flows through the relay coil 29, as for example—6 ma., to engage contact 33.

A two phase motor 44 mechanically connected to the output shaft 50 through a suitable gear reduction means 48, has field windings 42 and 43 the opposite ends of which are connected to the respective contacts 33 and 32. These windings are connected together at their other ends and to one side of the source 68 through leads 65 and 66. The vibrating reed 34 of the relay 31 is connected to the opposite side of said source 68, 62 and 63. Limiting resistors 38 and 39 and shunt condensers 35 and 36 are provided in the relay circuit to prevent sparking of the contacts.

To provide an effective means for imparting torque to the motor 44 and for enabling the direction of the applied torque to be reversed, a condenser 41 is connected in shunt with the contacts 32 and 33 and the field windings 42 and 43 of the motor 44.

Suitable gearing 48 is provided between the motor 44 and the load 51 and a damping device 47 is also connected to the motor shaft as an anti-hunt device.

The operation of the device may be described as follows: when vibrating reed 34 engages the contact 32 a potential is supplied from the source 68 by a circuit consisting of leads 62 and 63, reed 34, contact 32, resistance 39, winding 43 of the motor 44 leads 65 and 66 back to the power source 68.

The potential impressed on winding 42 however, is supplied through a circuit consisting of leads 62 and 63, reed 34 and contact 32, resistor 39, condenser 41 and winding 42, thence through return leads 65 and 66 to source 68.

It will be seen therefore, that potential is applied directly across winding 43 but is applied to winding 42 and condenser 41 in series. The potential across winding 42 therefore leads that impressed across 43 and the motor is caused to turn in a clockwise direction.

On the other hand when the current through winding 29 is above the predetermined minimum and the reed 34 is caused to engage contact 33 potential is supplied directly across winding 42 through leads 62 and 63, reed 34, contact 33, resistance 38, winding 42 and return through lead 65. The same potential however, is applied to winding 43 through the condenser 41 by a path consisting of leads 62 and 63, reed 34, contact 33, resistance 38, condenser 41, winding 43 and return through leads 65 and 66. Under these circumstances, the potential applied across winding 43 now leads the potential applied across winding 42 and the motor is caused to revolve in a counterclockwise direction.

If the vibrating reed 34 is actuated at a rapid rate, for example—60 cycles per second, the motor will tend to revolve first in one direction and then in another, but inasmuch as it has some inertia no resultant motion will take place, providing the reed 34 engages contact 32 for the same average length of time over a period of several cycles as the reed 34 engages contact 33. This is the desired operation of the device at zero setting, that is, when the input shaft 10 has the same angular position as the shaft 50.

If on the other hand the reed 34 engages either contact 32 or 33 for a greater average length of time there will be a resulting torque in either a clockwise or counterclockwise direction depending on which contact is engaged for the greater length of time. That is to say, considering $t^1$ to represent the time of engagement of contact 33 and $t_2$ to represent the time of engagement of contact 32, then when $t_1$ is greater than $t_2$ there is a counterclockwise torque produced while when $t_2$ is greater than $t_1$ there is a clockwise torque produced and where $t_1$ equals $t_2$ no torque is produced.

Figure 2A:
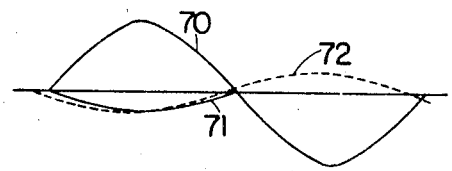
Figure 3A:
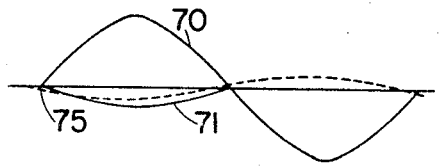
Figure 2B:
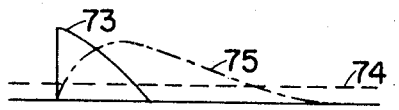
Figure 3B:
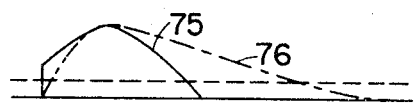
Figure 2C:
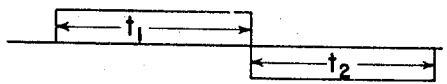
Figure 3C:
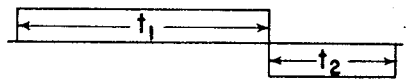

The operation of the device can be more readily understood by a reference to the curves of Figs. 2A, 2B, 2C, 3A, 3B and 3C wherein the curves of Figs. 2A, 2B and 2C indicate the operation under zero conditions when the input shaft 10 and output shaft have the same angular position and no error has been introduced into the system and the curves of Figs. 3A, 3B and 3C indicate the conditions obtaining when there is a difference in angular positions between the input shaft 10 and output shaft 50 and error is thus introduced into the system and is to be corrected thereby.

In Fig. 2A solid line curve 70 represents the potential applied to the plate circuit of the thyratron 21 at any instant from the secondary 54 of the transformer 67. The solid line curve 71 represents the firing voltage which must be applied to the input circuit to cause the tube to operate at any particular plate potential. Under zero error conditions the potential applied to the input circuit of the thyratron 21 which is the algebraic sum of the potentials of the phase biasing network comprising condenser 57 and potentiometer 56 and potential developed in the rotor 19 is caused to follow the curve 72 by means of suitable adjustment of the phase network. Under these conditions, the grid potential as indicated by curve 72 reaches the firing potential as represented by curve 71 when the plate potential 70 is at its peak value. The thyratron 21 is thereby caused to fire during a quarter cycle as indicated by the solid line curve 73 of Fig. 2B.

If no other means were provided, current would flow in the thyratron output circuit and in coil 29 of the relay 31 only during one quarter of a cycle and hence reed 34 would be caused to engage contact 33 only during this quarter cycle and would engage contact 33 during the remaining three quarters of the cycle. The reed 34 would therefore engage contact 32 for a period approximately 3 times as long as it engages contact 33.

To provide the criterion of equal lengths of time of contact under zero conditions, the delay network consisting of condenser 28 and potentiometer 27 is provided. This delay network is so adjusted that when the thyratron 21 is caused to fire the condenser 28 is charged rapidly through the left hand end of potentiometer 27 and when the thyratron is no longer in firing condition the condenser 28 discharges relatively slowly through the right hand end of potentiometer 27 and relay coil 29 maintaining the current in this coil above its threshold operating current condition as represented by dotted line 74 of Fig. 2B. A curve representative of the current flowing through the relay coil 29 is indicated by the dash dot curve 75 of Fig. 2B and it will be seen that this current is maintained above the threshold operating current of the relay coil 29 for a full half cycle. This results in an operation of the relay contacts as indicated diagrammatically by the graph of Fig. 2C wherein reed 34 engages contact 33 for a time $t_1$ and for the remainder of the cycle engages contact 32 for an equal time $t_2$. Under such circumstances as heretofore indicated, no resultant motion of the motor 44 takes place.

Consider now a condition wherein the output shaft 50 has a different angular relationship with the input shaft 10. Under these conditions, the potential applied to the input of the thyratron 21 which consists of the voltage generated in the winding 19 of the synchro 15 and the bias voltage of the phase network 56 and 57 is such that the family of curves of Fig. 3A are produced. As in Fig. 2A the solid curve 70 represents the potential applied to the output of thyratron 21 and the curve 71 represents the firing potential. The increase in voltage generated in the winding 19 causes the thyratron to strike at a point prior to the peak potential applied to the plate current as indicated by the dotted curve 75.

Referring now to the curves of Fig. 3B it will be seen that the thyratron is operative for a greater proportion of the time. Again by reason of the delay network consisting of condenser 28 and potentiometer 27 the current in the relay coil 29 is maintained above the threshold current for a length of time after the thyratron has ceased to fire and this current follows the dash dot curve 76. Under these circumstances the reed 34 is caused to engage contact 33 for a time $t_1$ which is greater than the time $t_2$ which the reed 34 engages contact 32. There is therefore as heretofore described, a torque on the motor which causes it to revolve in a counterclockwise direction at a speed depending on the torque applied thereby causing the output shaft 50 to assume the same angular relationship of the input shaft 10 and the error to be corrected. It will be seen therefore that if the output shaft 50 ends to assume a different phase relationship from that of the input shaft 10, an error voltage will be impressed on the servo mechanism which through action of the thyratron 21 and relay 31 will cause the motor 44 to correct such error in phase relationship.

While there has been described what is considered the preferred embodiment of the invention, it will be obvious to those skilled in the art to which it appertains that various modifications may be made within the spirit and scope of the invention as set forth in the appended claims.

I claim:

1. In a servo mechanism of the class described, the combination which comprises an output shaft and an input shaft, means for generating an error voltage whose amplitude is a function of the difference in angular position between said output and input shafts, control means comprising a single thyratron, an alternating current voltage source, means for impressing said error voltage and said alternating voltage on the input of said thyratron control means, relay means controlled by the thyratron control means, delay means connected to the output of said thyratron means and to said relay means, a motor connected to said output shaft, means operable by said relay means to control the direction and speed of rotation of said motor whereby said output shaft is caused to assume the same angular position as said input shaft.

2. In a servo mechanism of the class described, a manually operable input shaft, an output shaft operated by a two phase motor, means for generating an error voltage having an amplitude proportional to the difference in angular position between said output shaft and said input shaft, means for firing a thyratron at a predetermined point in its cycle depending on the amplitude of the error voltage, a relay connected in the output circuit of said thyratron for controlling the direction of rotation and speed of said motor and delay means connected to the output circuit of the said amplifier and to said relay whereby current is maintained above a predetermined minimum in said thyratron output circuit and said relay during a portion of the negative half cycle of said thyratron.

3. In a servo mechanism of the class described, an input shaft, an output shaft, means for generating an error voltage the amplitude of which is proportional to the difference in angular position between said input shaft and said output shaft, a two phase motor operatively connected to said output shaft through gearing means, means comprising a single pole double throw relay connected to a source of power and to said motor for alternately connecting said source of power directly to one of said motor windings and to the other of said winding in series with a capacity thereby alternately applying a clockwise and counterclockwise torque to said motor, said relay being connected in the output of a single thyratron amplifier and operable thereby to its alternate positions of contact, means for impressing said error voltage on the input of said thyratron amplifier whereby said thyratron is caused to fire at a predetermined point in its cycle depending on the amplitude of said error voltage and delay means connected in the output circuit of said amplifier and to said relay whereby current is maintained above a predetermined minimum in said thyratron output circuit during a portion of the negative half cycle thereof.

4. In a servo mechanism of the class described, a single thyratron amplifier, an alternating current power supply therefor, means for impressing an alternating current bias on said thyratron, means for superimposing on said alternating current bias an error voltage which is proportional to the difference in angular displacement between an output shaft and an input shaft, relay means actuated by the pulsating current output of said thyratron for connecting the power supply directly to one field coil of a two phase motor and to the other field coil in series with a condenser and for reversing said field and condenser connections in a predetermined timed relation, a delay network connected to said thyratron output and to said relay means to maintain the current in said relay means above a predetermined minimum during a portion of the time when a negative potential is impressed on said thyratron output from said alternating current source, damping means for said motor and gear reducing means connecting said motor to said output shaft and to said error voltage producing means, whereby said output shaft is maintained in correct angular relationship with respect to said input shaft.

5. In a servo mechanism of the class described, a single thyratron amplifier, an alternating current power supply therefor, means for impressing an alternating bias on said thyratron and means for adjusting the phase and amplitude of said bias, means for superimposing an error voltage on said alternating current bias which is a function of the difference in angular displacement between an output shaft and an input shaft, a two phase motor connected through gearing to said output shaft and to said error voltage means, damping means for said motor, means for operating said motor in accordance with the amplitude and phase of said error voltage comprising a relay connected in the output of said thyratron operable to alternately apply a leading potential to one or the other of the field coils of said motor thereby successively applying a clockwise and counter-clockwise torque thereto in timed relation to the frequency of the alternating current source, delay means to maintain the current in said relay above a predetermined average for a portion of the negative half cycle of the potential applied to said thyratron output circuit whereby the average torque applied to said motor over a period of several cycles is of such a magnitude and direction as to correct any error of angular displacement between the output shaft and input shaft.

6. In a servo mechanism of the class described a single thyratron amplifier, an alternating current power supply therefor, an input shaft, an output shaft, electrical means associated with said output shaft and said input shaft and connected to the input of said thyratron amplifier for producing an error voltage of a phase and amplitude proportional to the angular displacement between said output and input shafts, an alternating current bias means connected to the input of said thyratron and in series with said error voltage producing means, a condenser and variable resistor associated with said alternating current bias supply means for adjusting the phase and amplitude of the bias potential applied to the input of said thyratron, a single pole double throw relay having its relay coil connected in the output circuit of said thyratron amplifier and its fixed contacts to opposite ends of the field coils of a two phase motor the remaining ends of which are connected together and to one terminal of an alternating power supply source, the other terminal of said power supply source being connected to the armature of said relay, a condenser connected across said fixed contacts and said field coils, said motor being mechanically connected through gearing to said output shaft and a delay network comprising a potentiometer and condenser associated with the output circuit of said thyratron and said relay coil.

7. In a servo mechanism having a manually operable input shaft and a motor driven output shaft, the combination which comprises means for producing a voltage which is a function of the difference in angular position between said input shaft and said output shaft, a single gas discharge tube actuated by said voltage, a delay circuit connected to the output circuit of said gas discharge tube and relay means operable by the output current of said gas discharge tube for controlling the direction and amount of rotation of the motor connected to said otuput shaft whereby the difference in angular position between said input and output shafts is minimized.

8. In a device of the character described, a gas discharge tube having an input circuit and an output circuit, means for supplying an alternating current potential to said input circuit and said output circuit, means for adjusting the phase and amplitude of the alternating current potential supplied to said input circuit, means for superimposing on said alternating current input potential a second potential having a phase and amplitude which is a function of the difference in angular position between an output shaft and an input shaft, relay means having a single movable contact and two fixed contacts connected in the output circuit of said gas discharge tube and operable thereby to cause said movable contact to alternately engage said fixed contacts in timed relation to the pulsating current produced in said output circuit by the firing action of said gas discharge tube, delay means for maintaining the pulsating current in said output circuit above a predetermined value during a portion of the negative half cycle of potential applied to said gas discharge tube output circuit, motor means electrically connected to said relay contacts and mechanically connected to said output shaft, means including said relay for alternately applying a clockwise and counter-clockwise torque to said motor in accordance with the alternate engagement of said movable contact with said fixed contacts thereby causing said motor to rotate said output shaft in such a direction and to such an extent that said output shaft assumes substantially the same angular position as said input shaft.

9. In a device of the character described, a gas discharge tube having an input circuit and an output circuit, means for supplying an alternating current potential to said input circuit and said output circuit, means for superimposing on said alternating current input potential a second potential having a phase and amplitude which is a function of the difference in angular position between an output shaft and an input shaft, relay means having a single movable contact and two fixed contacts connected in the output circuit of said gas discharge tube and operable thereby to cause said movable contact to alternately engage said fixed contacts in timed relation to the pulsating current produced in said output circuit by the firing action of said gas discharge tube, delay means for maintaining the pulsating current in said output circuit above a predetermined value during a portion of the negative half-cycle of potential applied to said gas discharge tube output circuit, motor means electrically connected to said relay contacts and mechanically connected to said output shaft, means including said relay for alternately applying a clockwise and counter clockwise torque to said motor in accordance with the alternate engagement of said movable contact with said fixed contacts thereby causing said motor to rotate said output shaft in such a direction and to such an extent that said output shaft assumes substantially the same angular position as said input shaft.

10. In a device of the character described, a gas discharge tube having an input circuit and an output circuit, means for supplying an alternating current potential to said input circuit and said output circuit, means for superimposing on said alternating current input potential a second potential having a phase and amplitude which is a function of the difference in angular position between an input shaft and an output shaft, relay means connected in the output circuit of said gas discharge tube and operable by the output current thereof, delay means for maintaining the current in said output circuit above a predetermined value during a portion of the half cycle when a negative potential is applied to said gas discharge tube output circuit, motor means electrically connected to said relay means and mechanically connected to said output shaft, means including said relay for alternately supplying a positive and negative torque to said motor at a frequency corresponding to that of the alternating supply source thereby causing said motor to rotate said output shaft in such a direction and to such an extent that said output shaft assumes substantially the same angular position as said input shaft.

11. In a device of the character described, a gas discharge tube having an input circuit and an output circuit, means for supplying an alternating current potential to said input circuit and said output circuit, means for adjusting the phase and amplitude of the alternating current potential supplied to said input circuit, means for superimposing on said alternating current input potential a second potential having a phase and amplitude which is a function of the difference in angular position between an input shaft and an output shaft, relay means connected in the output circuit of said gas discharge tube and operable by the output current thereof, delay means for maintaining the current in said output circuit above a predetermined value during a portion of the half cycle when a negative potential is applied to said gas discharge tube output circuit, motor means electrically connected to said relay means and mechanically connected to said output shaft, means including said relay for alternately supplying a positive and negative torque to said motor at a frequency corresponding to that of the alternating supply source thereby causing said motor to rotate said output shaft in such a direction and to such an extent that said ouput shaft assumes substantially the same angular position as said input shaft.

CLARKE M. GILBERT.

REFERENCES CITED

The following references are of record in the file of this patent:

UNITED STATES PATENTS

| Number | Name | Date |
|---|---|---|
| 1,562,917 | Richter | Nov. 24, 1925 |
| 1,743,794 | Murphy | Jan. 14, 1930 |
| 1,838,084 | Drake | Dec. 29, 1931 |
| 1,960,350 | Shackleton et al. | May 29, 1934 |
| 2,089,914 | Freeman | Aug. 10, 1937 |